J. M. CAPE.
BOLL WEEVIL EXTERMINATING DEVICE.
APPLICATION FILED JUNE 10, 1920.

1,380,351.

Patented June 7, 1921.
4 SHEETS—SHEET 2.

Inventor
John M. Cape
By
Attorney

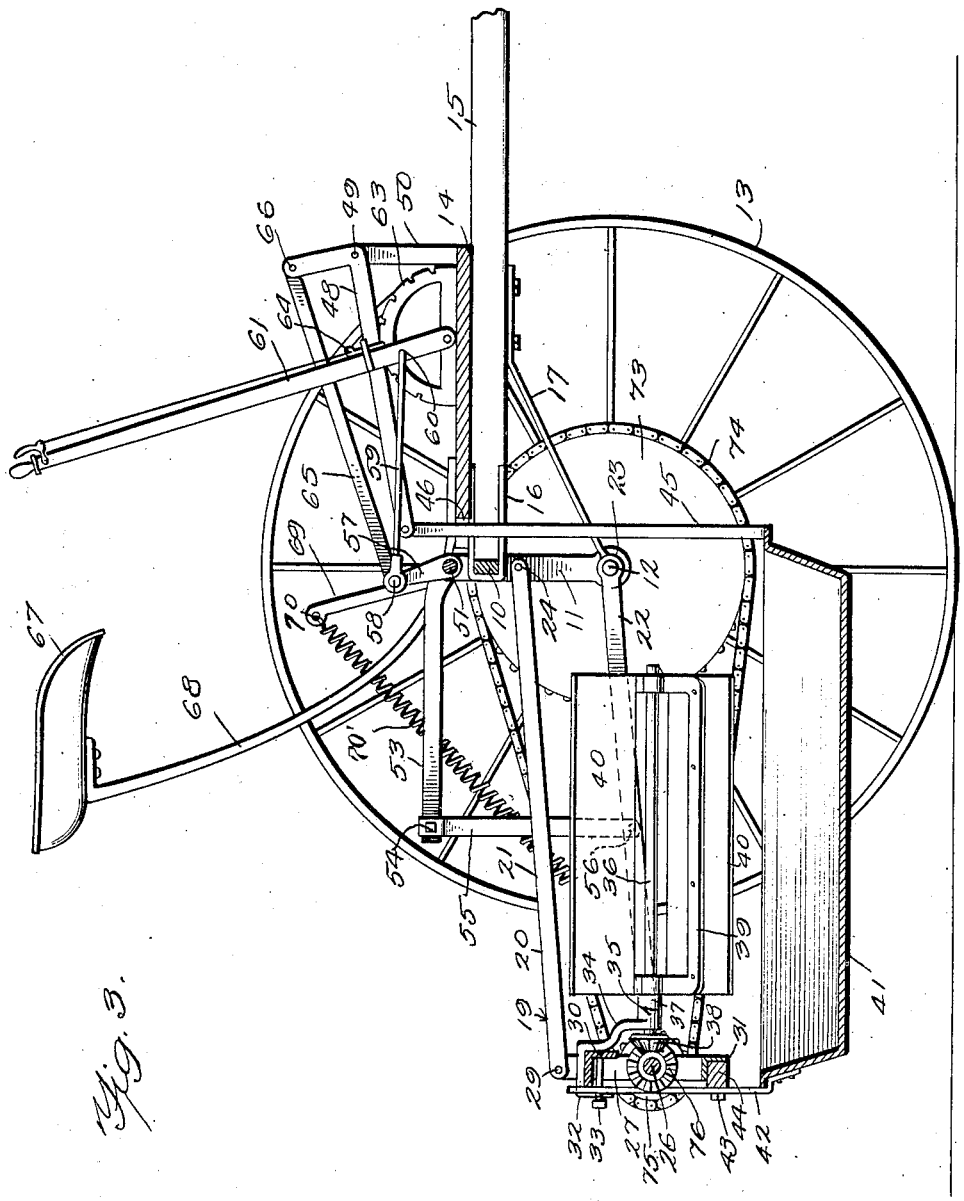

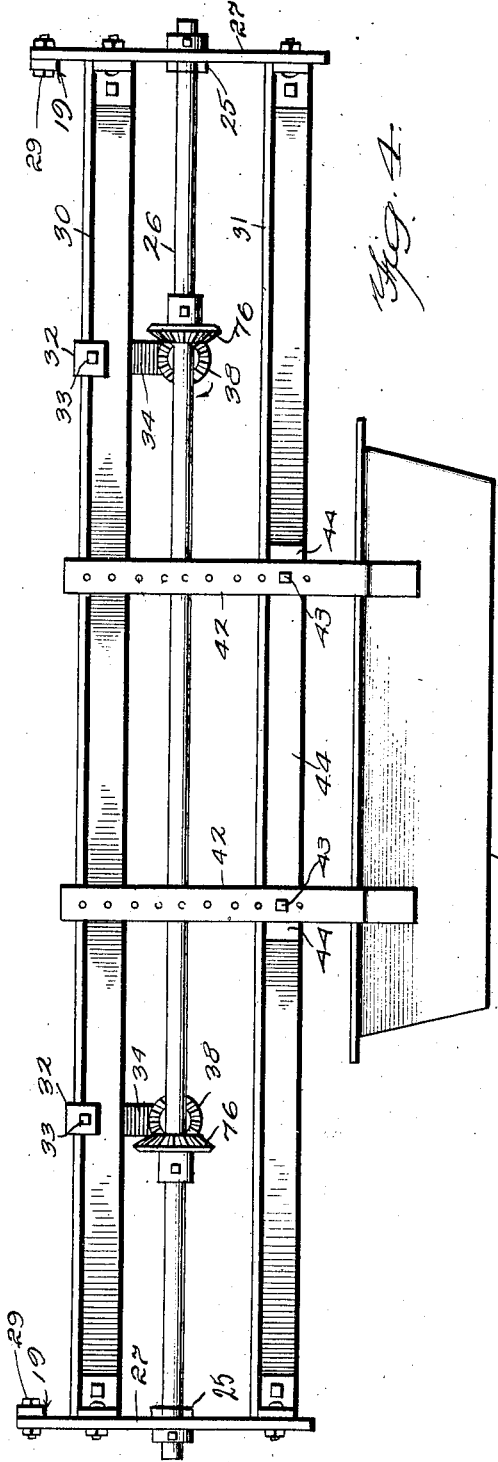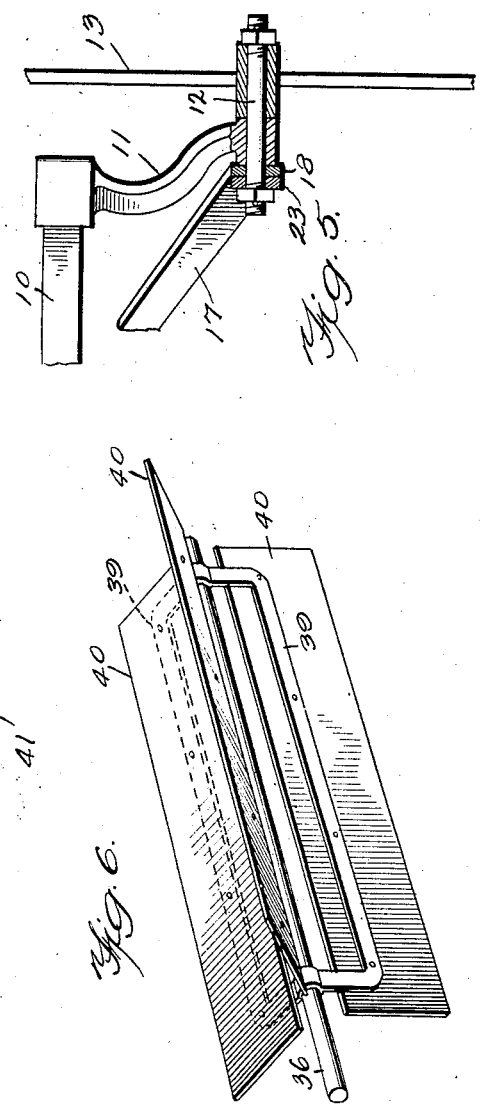

UNITED STATES PATENT OFFICE.

JOHN M. CAPE, OF SAN MARCOS, TEXAS.

BOLL-WEEVIL-EXTERMINATING DEVICE.

1,380,351.      Specification of Letters Patent.      Patented June 7, 1921.

Application filed June 10, 1920. Serial No. 388,001.

*To all whom it may concern:*

Be it known that I, JOHN M. CAPE, a citizen of the United States, residing at San Marcos, in the county of Hays and State of Texas, have invented certain new and useful Improvements in Boll-Weevil-Exterminating Devices, of which the following is a specification.

My invention relates to a machine for destroying vermin, insects or the like, and the eggs of the same, and has particular reference to such a machine adapted to remove the cotton boll weevil, or the punctured squares containing the eggs of this weevil, from the cotton plant, while the machine is not necessarily restricted to this particular use.

An important object of the invention is to provide a machine of the above mentioned character, having the beater and insect catching element, vertically adjustable, so that the machine may be used for treating the cotton plant or the like, during different stages of development or growth of the plant.

A further object of the invention is to provide a vertically adjustable supporting frame, carrying the rotatable beaters, which is so constructed that the beaters and catching pan connected therewith, are maintained in a substantially horizontal position, during their vertical adjustments.

A further object of the invention is to provide means whereby the adjustments of the rotatable beaters and catching pan are effected by a single lever.

A further object of the invention is to provide means whereby the movable or rotatable beaters may be adjusted laterally toward and away from each other, in accordance with the width of the row.

Other objects and advantages of the invention will be apparent during the course of the following description.

Figure 1:
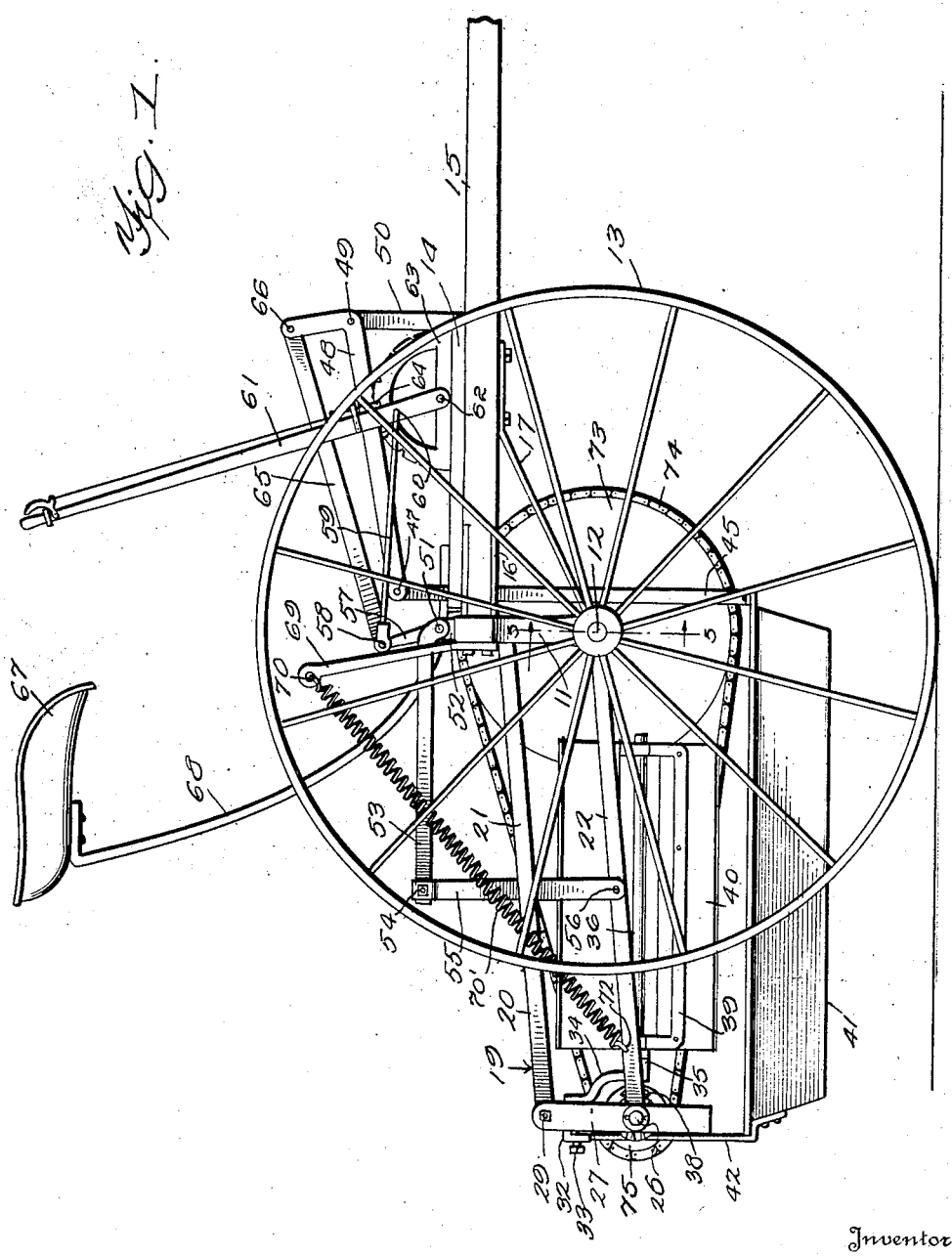
Figure 2:
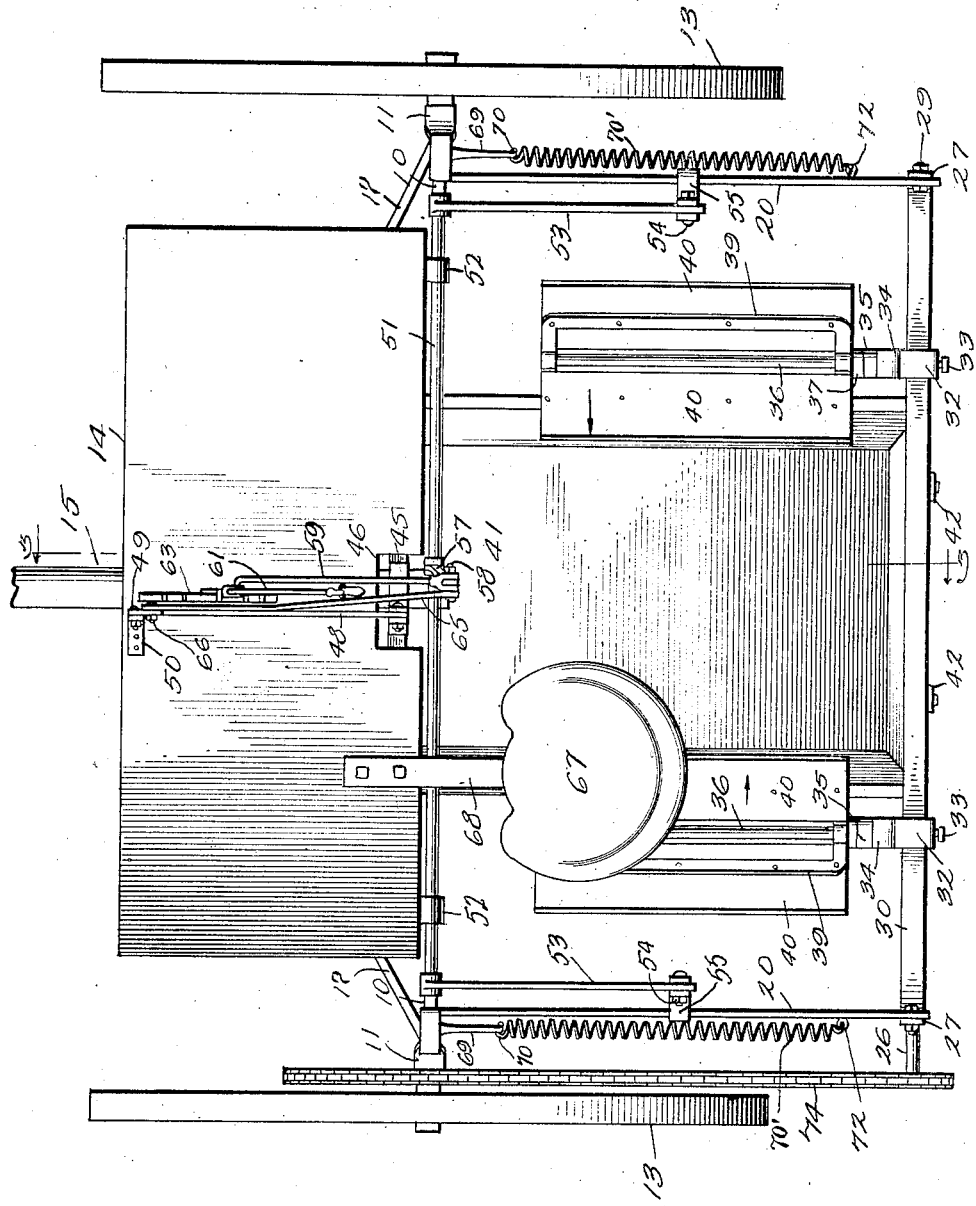

In the accompanying drawings forming a part of this specification, and in which like numerals are employed to designate like parts throughout the same, Figure 1 is a side elevation of a machine embodying my invention, Fig. 2 is a plan view of the same, Fig. 3 is a longitudinal section taken on line 3—3 of Fig. 2, Fig. 4 is a rear elevation of the rear frame-section, Fig. 5 is a detail section taken on line 5—5 of Fig. 1, and Fig. 6 is a perspective view of a rotatable beater.

In the drawings, wherein for the purpose of illustration is shown a preferred embodiment of my invention, the numeral 10 designates the arch axle of the machine, having depending substantially vertical cranks 11, rigidly secured to the ends thereof. The cranks 11 carry outwardly projecting spindles 12, upon which wheels 13 are mounted. The numeral 14 designates a substantially horizontal transverse support or platform, rigidly secured to a tongue 15, extending forwardly and longitudinally of the machine. This tongue is adapted to be drawn by draft animals, a tractor or the like. The tongue 15 has its rear end rigidly secured to the axle 10, by means including a strap-iron 16. The numeral 17 designates diagonal braces, rigidly secured to the lower side of the tongue 15, and diverging rearwardly and downwardly, and having apertured rear ends 18, receiving the inner ends of the spindles 12, which project inwardly beyond the cranks 11.

The machine embodies a vertically adjustable supporting frame 19, embodying parallelogram side frame members 20, each including upper and lower longitudinal bars 21 and 22. The lower bar 22 is provided at its forward end with an apertured head 23, pivotally receiving the rear end of the spindle 12, as more clearly shown in Fig. 5. The upper bar 21 is pivoted to the crank 11, at a point above and spaced from the spindle 12, as shown at 24. The rear end of each bar 22 has an apertured head 25, pivotally receiving a rear transverse driving shaft 26. This shaft 26 also has pivotal connection with vertical end members 27, arranged at the ends of the bars 21 and 22. The end members 27 are pivoted at their upper ends, at 29, with the rear ends of the upper bars 21, and constitute a part of the parallelogram side frame members.

A rear frame section is carried by the vertical end members 27, embodying a horizontal transverse bar 30, of angle iron, rigidly attached to the members 27, above the shaft 26, but beneath the pivots 29. A second bar 31 is preferably employed to rigidly connect the lower ends of the members 27, beneath the shaft 26.

The numeral 32 designates a pair of brackets, adapted to engage over the bar 30, such brackets being U-shaped in cross section. These brackets are longitudinally adjustably mounted upon the bar 30, and may be clamped thereto in adjustment by manipulation of clamping bolts 33. These adjustable brackets are provided at their forward ends with depending arms 34, having bearings 35, rotatably receiving longitudinal horizontal shafts 36. These shafts are held against longitudinal displacement by collars 37 and bevel gears 38, rigidly secured thereto, upon opposite sides of the bearings. The shafts 36 carry rotatable beaters, embodying radial arms 39, rigidly secured to these shafts, and flexible strips 40 connected between the radial arms. These flexible strips 40 may be formed of leather, canvas, belting or the like. The strips 40 project radially beyond the fingers 39, which are approximately U-shaped, and hence these strips alone come in contact with the plants.

The numeral 41 designates a catching pan, into which the insects are shaken or beaten by the rotatable beaters, and this pan may be partly filled with an insecticide, such as coal oil, or any other suitable insecticide. The rear end of the pan is supported by straps 42, provided with a plurality of apertures, for receiving bolts 43, carried by a block 44, attached to the rear bar 31. These apertures permit of an adjustment of the pan with relation to the bar 31, when necessary. The forward end of the pan is supported by an inverted U-shaped hanger 45, attached thereto, and extending upwardly upon opposite sides of the tongue 15, and passing through an opening 46. The upper end of the hanger 45, is pivoted at 47, upon a bell crank lever 48, pivoted at 49, upon a bracket or support 50, rigidly mounted upon the platform 14, as shown.

The means for raising and lowering the adjustable supporting frame and the catching pan, embodies a transverse rock shaft 51, journaled through bearings 52, rigidly mounted upon the axle 10. This rock shaft carries rearwardly extending arms 53, rigidly secured thereto, near its ends, and having pivotal connection, at 54, with depending links 55, pivoted at 56 to the lower bars 22. The rock shaft is turned by an upstanding crank 57, rigidly secured thereto, and having pivotal connection at 58, with a link or rod 59, extending forwardly for pivotal connection at 60, with a hand-lever 61, pivoted at 62, adjacent a toothed quadrant 63. The lever 61 carries the usual latch 64, to engage with the toothed quadrant 63. The numeral 65 designates a link, the rear end of which is apertured for receiving the pivot 58, while the forward end of this link is pivotally connected with the bell crank lever 48, at 66.

An operator's seat 67 is arranged near the lever 61, and is supported by a bar 68, rigidly mounted upon the platform 14.

Stationary upstanding arms 69, are rigidly secured to the axle 10, near its ends, and have connection at 70 with retractile coil springs 70', connected at 72 with the lower bars 22. These springs serve to absorb the shocks in the vertical adjustment of the supporting frame, and also to aid in lifting the same, thus taking a portion of the work off of the operator of the lever 61.

A sprocket wheel 73 is rigidly connected with one wheel 13, for rotation therewith, and this sprocket wheel drives a sprocket chain 74, extending rearwardly to engage and drive a sprocket wheel 75, rigidly mounted upon the shaft 26. Particular attention is called to the fact that the sprocket wheel 75 is swung about the pivot 12, which is also the center of the sprocket wheel 73, and hence the vertical adjustment of the sprocket wheel 75, will not cause binding action of the chain 74. The shaft 26 carries bevel gears 76, adapted to be longitudinally adjusted thereon, and clamped thereto for rotation therewith, in adjustment, in engagement with the bevel gears 38.

The operation of the machine is as follows:

The machine is drawn longitudinally of the rows of cotton or the like, and the pan 41 travels between two of the rows, the wheels 13 traveling upon the outer sides of these rows. The rotation of the wheels 13 is imparted to the rotatable beaters, through the medium of the sprocket chain 74 and associated elements. These beaters have their lower portions rotating inwardly in the direction of the arrows, Fig. 2, and serve to beat the plants toward the pan, whereby the boll weevil or punctured squares containing the egg of the weevil, or other insect is thrown into the pan, containing a suitable insecticide, whereby they are destroyed. The rotatable beaters and pan are simultaneously raised and lowered, while maintaining the horizontal position, by swinging the lever 61 upon its pivot. This lever turns the rock shaft 51, which raises or lowers the arms 53, in turn adjusting the bar 22. This movement of the rock shaft is imparted to the link 65, which swings bell crank lever 48 upon its pivot, for raising hanger 45 and forward end of the pan 41, its rear end being suspended from the straps 42.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. In a machine for destroying insects or the like, an axle, wheels carried by the axle, side frame members, each embodying a parallelogram including upper and lower longitudinal bars connected with the axle and substantially vertical end members connected with the rear ends of said bars, a transverse bar connecting the substantially vertical end members, substantially horizontal rotatable beaters carried by the transverse bar, means driven by one wheel for driving the beaters, means to vertically move the parallelograms, and a catching pan arranged beneath and between the beaters and connected with the machine for travel therewith.

2. In a machine for destroying insects or the like, a frame work, wheels supporting the same, side frame members, each embodying upper and lower longitudinal bars having their forward ends pivotally connected with said frame-work to swing in a substantially vertical plane, substantially vertical end members connecting the rear ends of the upper and lower bars, a transverse bar connecting said end members, rotatable beaters carried by the transverse bar, means driven by one wheel for driving the beaters, a catching pan arranged between the beaters and having its rear end connected with the transverse bar, means to vertically adjust the side frame members, and means to vertically adjust the forward end of the catching pan.

3. In a machine for destroying insects or the like, a frame-work, wheels supporting the same, a supporting frame pivotally connected at its forward end with the frame-work to swing vertically with relation thereto, rotatable beaters carried by the rear portion of the vertically swinging supporting frame, means to drive the beaters, a catching pan arranged between the beaters and having its rear portion connected with the rear portion of the supporting frame to move therewith, vertically adjustable supporting means for the forward end of the pan, separate from the supporting frame and means to move the rear end of the supporting frame and the supporting means, vertically, and in unison.

4. In a machine for destroying insects or the like, a frame-work, wheels supporting the same, a frame pivotally connected at its forward end with the frame-work to swing vertically, rotatable beaters carried by the rear portion of the vertically movable frame, means to drive the beaters, means to vertically swing the frame, a pan arranged near the rotatable beaters, supporting means connecting the pan and the rear portion of the vertically swinging frame, a supporting member connected with the forward portion of the pan and separate from the vertically swinging frame, means to vertically adjust the supporting member, and common means to operate the two vertically adjusting means in unison.

5. In a machine for destroying insects or the like, a frame-work, wheels supporting the same, a vertically movable frame pivotally connected with the frame-work, rotatable beaters carried by the vertically movable frame, means to drive the beaters, a pan arranged near and beneath the beaters and connected with the rear portion of the vertically movable frame, a hanger separate from the vertically movable frame connected with the forward end of the pan, a manually operated lever carried by the frame-work, means operated by the lever to vertically adjust the hanger, a rock shaft carried by the frame-work, means operated by the rock shaft to shift the vertically adjustable frame, and means connecting the rock shaft and lever.

6. In a machine for destroying insects or the like, a frame-work, wheels supporting the frame-work, a vertically adjustable transverse frame, vertically swinging supporting means pivotally connected with the transverse frame and frame-work and serving to raise and lower the transverse frame without turning the same upon its longitudinal axis, means to move the vertically swinging supporting means, rotatable beaters carried by the transverse frame, means to drive the beaters, a pan beneath the beaters having its rear end connected with the transverse frame, and separate means arranged upon the frame-work and connected with the forward end of the pan to support and vertically adjust it.

7. In a machine for destroying insects or the like, a frame-work, wheels supporting the same, pairs of spaced superposed bars having their forward ends pivotally connected with the frame-work, end members pivotally connected with the bars, means to vertically adjust the bars, a transverse bar extending between and connecting the end members, a transverse shaft journaled in said end members, bearings longitudinally adjustably mounted upon the transverse bar, rotatable beaters embodying shafts held within the bearings, bevel gears carried by the shafts of the beaters, coacting bevel gears longitudinally adjustably mounted upon the transverse shaft, means driven by one wheel to operate the transverse shaft, and means to catch the insects or the like removed by the beaters.

In testimony whereof I affix my signature in presence of two witnesses.

JOHN M. CAPE.

Witnesses:
RENE CAPE,
R. B. McRELL.